United States Patent Office 3,796,757
Patented Mar. 12, 1974

3,796,757
ORGANIC PEROXIDES
Yun Ger Chang, Austin, Tex., assignor to Reichhold Chemicals, Inc., White Plains, N.Y.
No Drawing. Original application Aug. 12, 1969, Ser. No. 849,488. Divided and this application May 4, 1971, Ser. No. 140,263
Int. Cl. C07c 49/06
U.S. Cl. 260—590    6 Claims

ABSTRACT OF THE DISCLOSURE

This invention discloses a process of making an organic beta-keto perester. Accordingly, 2,2,4-trimethyl-3-hydroxy-3-pentenoic acid beta lactone is reacted with an organic hydroperoxide at a temperature ranging from about −10° C. to about 80° C. in the presence of an acidic or a basic catalyst. The mole ratio of the reactants can vary from about 1:10 to about 10:1.

---

This invention relates to some novel peroxides and methods of making them. Particularly, the present invention relates to peroxides obtained by the reactions between unsaturated beta-lactones and hydroperoxides. More particularly, this invention is directed to peroxides derived from 2,2,4-trimethyl-3-hydroxy-3-pentenoic acid beta-lactone and hydroperoxides.

These new peroxides are the beta-keto peresters, peroxy 2,2,4-trimethyl-3-oxovalerates, which may be represented by the following general formula,

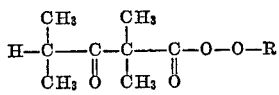

wherein R is alkyl, cycloalkyl, alkcycloalkyl, aralkyl, arcycloalkyl (aryl-substituted cycloalkyl), a cycloalkyl or an alkcycloalkyl condensed or fused with an aromatic ring, or the corresponding substituted moiety bearing one or more substituents, such as halogen atoms, alkyl, carboxy, nitro, hydroxy groups.

Like other beta-lactones, 2,2,4-trimethyl-3-hydroxy-3-pentenoic acid beta-lactone is a highly reactive substance. It is known that the treatment of beta-lactones, in various media, with a reactive reagent which can give a proton and an anion during the reaction, leads to the cleavage of the lactone ring at either the ester linkage to give a derivative of the corresponding beta-hydroxy carboxylic acid or the ether linkage to afford the corresponding beta-substituted carboxylic acid. It has also been reported that under similar experimental conditions the 2,2,4-trimethyl-3-hydroxy-3-pentenoic acid beta-lactone ring can only be opened at the ester linkage and the final products appear to be the derivatives of 2,2,4-trimethyl-3-oxovaleric acid. This is presumably due to the presence of the beta-gamma carbon-carbon double bond and the two methyl groups attached to the alpha carbon atom in the molecule of this unsaturated beta-lactone. However, there has been no description in the literature concerning the reaction of beta-lactones with hydro-peroxides.

It has been known for a long period of time that peresters can be prepared by reacting acyl halides with hydroperoxides in basic media. It was also known in the literature that reactions of anhydrides of lower, saturated, aliphatic carboxylic acids with hydroperoxides in the presence of a strong base lead to the formation of the corresponding peresters. No effort has ever been made to convert beta-lactones into peresters.

An object of the present invention is to provide novel organic peroxides which are highly efficient polymerization initiators and cross-linking agents.

Another object of this invention is to provide highly efficient methods for preparing such polymerization initiators.

It is another object of this invention to produce peresters without the formation of a salt by-product which is formed during the preparation of peresters using the usual procedure.

It is another object of this invention to obtain organic peroxides from beta-lactones reacted with hydroperoxides.

It is still another object of this invention to obtain beta-keto peresters from unsaturated beta-lactones and hydroperoxides.

It is a further object of the present invention to obtain beta-keto peresters, namely peroxy 2,2,4-trimethyl-3-oxovalerates, from 2,2,4-trimethyl-3-hydroxy-3-pentenoic acid beta-lactone and hydroperoxides.

These and other objects and advantages of the present invention will become more apparent from the following detailed descriptions.

It has been found that these objects can be attained by reacting 2,2,4-trimethyl-3-hydroxy-3-pentenoic acid beta-lactone with hydroperoxides, with or without a solvent, in the presence of a base or an acid catalyst. The hydroperoxides employed for the preparations in this invention may be represented by the following general formula:

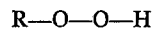

wherein R is as previously indicated in the structural formula of peroxides. The group of R radicals of the hydroperoxides which are used in this invention includes: t-butyl, t-amyl, 1,1,3,3-tetramethylbutyl, cumyl, p-methylcumyl, o-methylcumyl, p-isopropylcumyl, o-isopropylcumyl, p-n-butylcumyl, o-n-butylcumyl, p-sec-butylcumyl, o-sec-butylcumyl, p-t-butylcumyl, o-t-butylcumyl, p-chlorocumyl, o-chlorocumyl, p-bromocumyl, o-bromocumyl, p-nitrocumyl, o-nitrocumyl, p-carboxycumyl, α-ethyl-α-methyl-benzyl, phenylcyclohexyl, α-ethyl-α-methyl-m,m-di-sec - butylbenzyl, m,m - dicyclohexylphenylcyclohexyl, 1,4,4-triethyl - 1,2,3,4 - tetrahydronaphthyl, 1,4,4-triisopropyl-1,2,3,4-tetrahydronaphthyl, 1,4,4- - tri - sec-butyl-1,2,3,4 - tetrahydronaphthyl, 1,4,4-tri-t-butyl-1,2,3,4-tetrahydronaphthyl, 1,4,4-tri - t - amyl-1,2,3,4-tetrahydronaphthyl, 1,3,3-trimethylindanyl, triphenylmethyl, and the like.

Lactones are cyclic esters and enter into some ester reactions. Hydrolysis of beta-lactones can take place in either basic or acidic medium. When 2,2,4-trimethyl-3-hydroxy-3-pentenoic acid beta-lactone was reacted with a hydroperoxide in the presence of a base, such as sodium hydroxide, at room temperature, the corresponding beta-keto perester was obtained in a quantitative yield. The reaction appears to involve a nucleophilic attack on the carbon atom of the carbonyl group by a peralkoxy anion, ROO−, followed by acyl cleavage. The probable mechanism may be illustrated as follows:

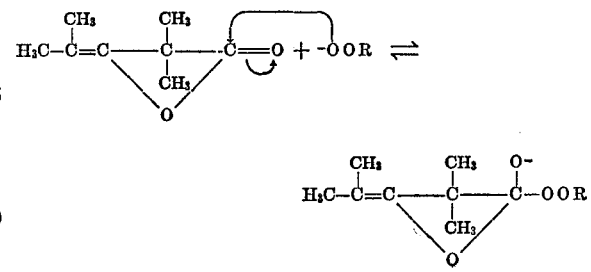

3,796,757

3
4

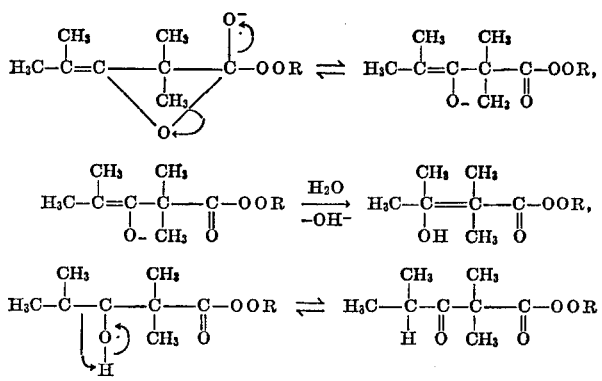

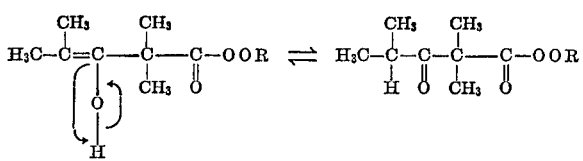

In the molecule of the final product, there is no hydrogen atom on the alpha carbon atom located between the two carbonyl groups. This prevents the formation of a conjugated enol. On the other carbon atom alpha to the keto group, there appears only on hydrogen atom which can merely be activated by the keto group. It is known that the quantity of enol form present in the equilibrium mixture of tautomers of a monoketone is extremely small. Furthermore, the substitution of alpha hydrogen atoms by alkyl groups decreases the amount of such enol form of a mono-ketone. Therefore, for this keto perester, there should not be a noticeable quantity of enol form. In fact, the peresters exist completely as keto form, as evidenced by the absence of hydroxy and carbon-carbon double bond bands in its infrared spectrum.

At room temperature, the reaction of 2,2,4-trimethyl-3-hydroxy-3-pentenoic acid beta-lactone with a hydroperoxide in an acid medium (for example sulfuric acid, p-toluenesulfonic acid, perchloric acid), afforded the same keto perester. The acid-catalyzed reaction seems more complicated than the base-catalyzed reaction. The protonation of the beta-lactone may occur at the negatively polarized carbonyl oxygen as well as the other oxygen to produce a cation. Then, the lactone ring can be opened either by acyl cleavage or by alkyl cleavage to give different products. Where the lactone ring cleavage occurs is mainly determined by the type of alkyl group. In general, the existence of a tertiary alkyl group leads to the alkyl cleavage since a stable tertiary carbonium ion is formed by such cleavage. The acid-catalyzed reaction of 2,2,4-trimethyl-3-hydroxy-3-pentenoic acid beta-lactone with hydroperoxides, ROOH, may be suitably explained by the following mechanism:

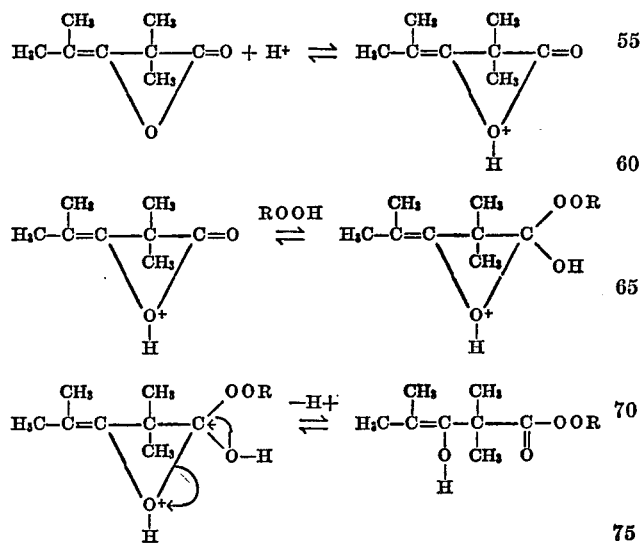

Because a molecule of the product contains one peroxy group, the mole ratio of 2,2,4-trimethyl-3-hydroxy-3-pentenoic acid beta-lactone to the hydroperoxide is in the order of 1:1. The mole ratio may vary widely, for example, from 10:1 to 1:10. However, the preferred mole ratio of this unsaturated beta-lactone to hydroperoxide is from about 1:1.1 to about 1:1.5.

The reactions can occur at a temperature ranging from about —10° to 80° C. However, the preferred reaction temperature is from about 25° C. to 35° C., on account of the outstanding results obtained therefrom.

In the present invention, the basic catalysts for the reaction between 2,2,4 - trimethyl - 3-hydroxy-3-pentenoic acid beta-lactone and hydroperoxides may be an alkali metal hydroxide, such as sodium hydroxide, potassium hydroxide, and the like, and the acidic catalyst includes sulfuric acid, hydrochloric acid, perchloric acid, phosphoric acid, p-toluenesulfonic acid, and the like. The quantity of catalyst used for the reaction may vary from a very small trace to about 30%, based upon the total weight of reactants. To avoid hydrolysis of the perester product and possible side-reactions, low concentration of catalyst in the reaction mixture is preferred. The suitable amount of catalyst is about 1% to 8%, based upon the total weight of reactants.

These novel peroxides have been found to be excellent initiators in polymerization reactions, such as the polymerization of styrene, alkyl methacrylates, vinyl esters, unsaturated polyesters, vinyl chloride and the like.

Some of the representative reactions are illustrated by the following equation for preparing the peroxy esters:

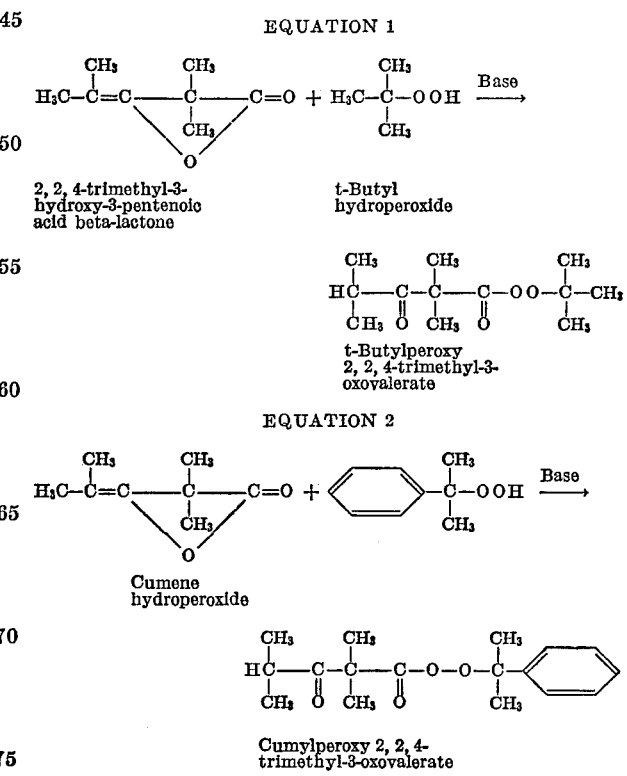

EQUATION 3

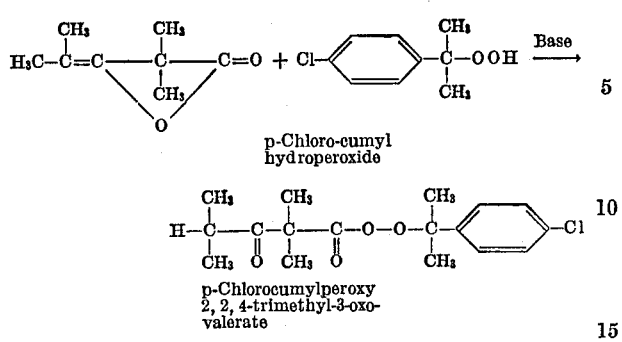

p-Chloro-cumyl hydroperoxide p-Chlorocumylperoxy 2,2,4-trimethyl-3-oxo-valerate

EQUATION 4

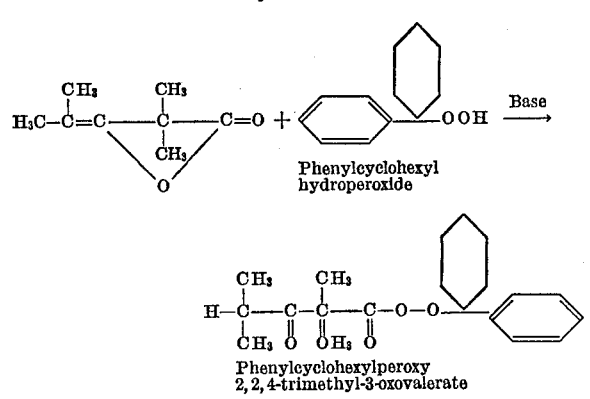

Phenylcyclohexyl hydroperoxide

Phenylcyclohexylperoxy 2,2,4-trimethyl-3-oxovalerate

EQUATION 5

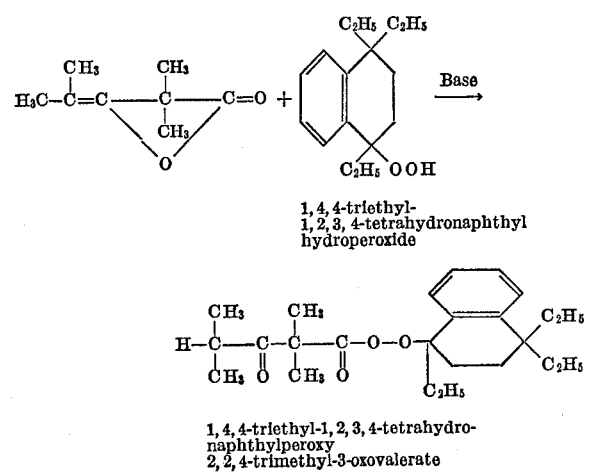

1,4,4-triethyl-1,2,3,4-tetrahydronaphthyl hydroperoxide 1,4,4-triethyl-1,2,3,4-tetrahydro-naphthylperoxy 2,2,4-trimethyl-3-oxovalerate

EQUATION 6

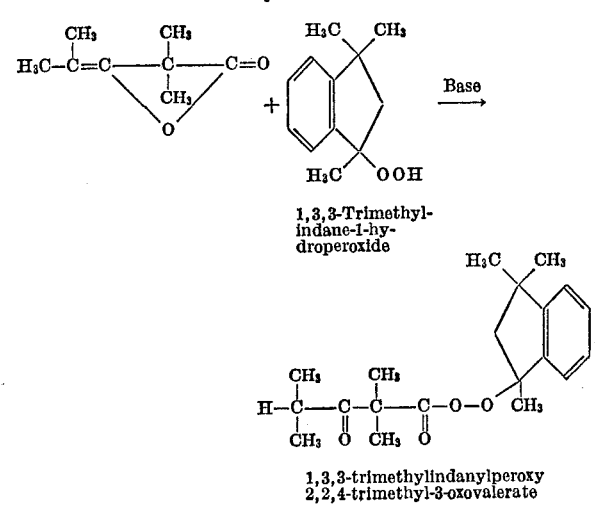

1,3,3-Trimethyl-indane-1-hydroperoxide 1,3,3-trimethylindanylperoxy 2,2,4-trimethyl-3-oxovalerate

EQUATION 7

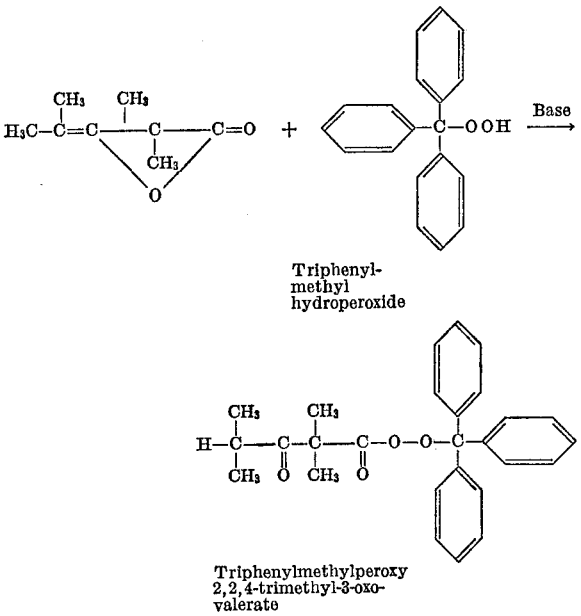

Triphenylmethyl hydroperoxide

Triphenylmethylperoxy 2,2,4-trimethyl-3-oxo-valerate

The following examples are given for the purposes of illustrating the present invention and not deemed to be limitative hereto.

EXAMPLE 1

Preparation of t-butylperoxy 2,2,4-trimethyl-8-oxo-valerate with a basic catalyst A solution of 2.00 g. (0.05 mole) of sodium hydroxide in 3 ml. of water was mixed with 20.84 g. (0.22 mole) of 90% t-butyl hydroperoxide at 10–20° C. To the resulting mixture was slowly added 28.00 g. (0.20 mole) of 2,2,4 - trimethyl-3-hydroxy-3-pentenoic acid beta-lactone, at 10–20° C., with agitation. After the addition, the reaction mixture was stirred at 10–20° C. for an hour and then stirred at 35° C. for four hours. The reaction mixture was mixed with 250 ml. of ether. The ether solution was washed twice with 50-ml. portions of water and dried over anhdyrous magnesium sulfate. Filtration and removal of ether and low-boiling materials under reduced pressure using a water aspirator and a rotating evaporator left a clear liquid product weighing 32.20 g., indicating a yield of 70.00% based upon the amount of 2,2,4-trimethyl-3-hydroxy-3-pentenoic acid beta-lactone used for the reaction.

The infrared spectrum of the crude liquid product showed no beta-lactone present. The product contained no hydroperoxide as indicated by the lead tetraacetate test. It reacted both with hydriodic acid and with potassium iodide solution. Only one brown spot with $R_f$ 0.97 was shown by the thin-layer chromatogram of this crude product on silica gel film obtained when a mixture of one volume of acetone and two volumes of carbon tetrachloride was employed as solvent and either hydriodic acid or potassium iodide solution was the developing agent. This indicated that the crude product contained only one peroxide. Its active oxygen content was 5.74% and 8.15% as determined by potassium iodide-sodium thiosulfate titration and hydriodic acid-sodium thiosulfate titration, respectively.

The product was purified by distillations at 53–54° C. and 3 mm. The purified liquid had 5.31% active oxygen as determined by potassium iodide-sodium thiosulfate method and 6.38% active oxygen as shown by hydriodic acid-sodium thiosulfate titration, as compared with the theoretical value 6.95%, $N_D^{25}$ 1.4310 and $d^{25}$ 0.995.

Analysis.—Calcd. for $C_{12}H_{22}O_4$ (percent): C, 62.58; H, 9.63; O, 27.79 (molecular weight 230.30). Found (percent): C, 62.55; H, 9.56; O, 27.80 (molecular weight 230).

The infrared spectrum of this compound in about 15% methylene chloride solution showed no band due to OH group; a strong band at 2950 cm.$^{-1}$ due to $CH_3$ groups; a weak band at 2890 cm.$^{-1}$ due to tertiary CH group; two very strong carbonyl bands with the same intensity located at 1760 cm.$^{-1}$ due to perester group and at 1710 cm.$^{-1}$ due to keto group; a strong band at 1460 cm.$^{-1}$ presumably due to C—$CH_3$ groups; a weak band at 1380 cm.$^{-1}$ together with a strong band at 1360 cm.$^{-1}$ representing $C(CH_3)_3$ and $C(CH_3)_2$ groups; a medium band at 1230 cm.$^{-1}$ and three strong bands at 1180 cm.$^{-1}$, 1100 cm.$^{-1}$ and 1020 cm.$^{-1}$, presumably indicating C—O linkage of perester; and a medium band at 830 cm.$^{-1}$ representing peroxide group.

On the basis of the analytical results and the infrared spectrum, the structure of this compound was assigned as shown on the right-hand side of Equation 1.

EXAMPLE 2

Preparation of t-butylperoxy 2,2,4-trimethyl-3-oxovalerate in presence of an acid cataly Seven grams (0.05 mole) of 70% sulfuric acid and 9.98 g. (0.10 mole) of 95% t-butyl hydroperoxide were mixed together at 10–20° C. To the resulting mixture was slowly added 14.00 g. (0.10 mole) of 2,2,4-trimethyl-3-hydroxy-3-pentenoic acid beta-lactone at 10–20° C. with agitation. The reaction mixture was stirred at 10–20° C. for an hour and then at 30–35° C. for five hours. The organic layer was separated. The aqueous layer was extracted three times with 20-ml. portions of ether. The ether extract was combined with the organic layer, and washed three times with 20-ml. portions of saturated sodium bicarbonate solution and twice with 20-ml. portions of water. Finally it was dried over anhydrous magnesium sulfate. Filtration and removal of solvent and low-boiling materials under reduced presure at room temperature using a water aspirator and a rotating evaporator gave a clear liquid product weighing 16.86 g., representing a 73.3% based upon the amount of 2,2,4-trimethyl-3-hydroxy-3-pentenoic acid beta-lactone used for the reaction. The product was purified by distillations at 53–55° C. and 3 mm. On the basis of analytical results, infrared spectrum and other information, this compound was the peroxide, t-butylperoxy 2,2,4-trimethyl-3-oxovalerate. Its structural formula is as shown on the right-hand side of Equation 1.

EXAMPLE 3

Preparation of t-amylperoxy 2,2,4-trimethyl-3-oxovalerate

A solution of 1.00 g. (0.025 mole) of sodium hydroxide in 1.5 ml. of water was mixed with 12.76 g. (0.11 mole) of 90% t-amyl hydroperoxide at 10–20° C. To the mixture was slowly added 14.00 g. (0.10 mole) of 2,2,4-trimethyl-3-hydroxy-3-pentenoic acid beta-lactone, at 10–20° C., with agitation. The reaction mixture was stirred at 10–20° C. for an hour and then stirred at 35° C. for four hours. It was mixed with 12.0 ml. of ether. The ether solution was washed twice with 50-ml. portions of water and dried over anhydrous magnesium sulfate. Filtration and removal of ether and low-boiling materials under reduced pressure gave a clear liquid product in 75% yield. The product was identified as t-amylperoxy 2,2,4-trimethyl-3-oxovalerate.

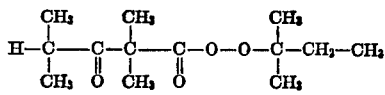

EXAMPLE 4

Preparation of 1,1,3,3-tetramethylbutylperoxy 2,2,4-trimethyl-3-oxovalerate

A solution of 1.00 g. (0.25 mole) of sodium hydroxide in 1.5 ml. of water was added to 16.06 g. (0.11 mole) of 1,1,3,3-tetramethylbutyl hydroperoxide at 10–20° C. Into the resulting mixture was slowly added 14.00 g. (0.10 mole) of 2,2,4-trimethyl-3-hydroxy-3-pentenoic acid beta-lactone, at 10–20° C., with stirring. The reaction mixture was stirred at 10–20° C. for an hour and, then at 35° C., for four hours. It was mixed with 120 ml. of ether. After being washed with two 50-ml. portions of water, the ether solution was dried over anhydrous magnesium sulfate. Filtration and removal of ether and low-boiling materials under reduced pressure left a clear liquid product in 75% yield, and identified as the desired keto perester having the following structural formula:

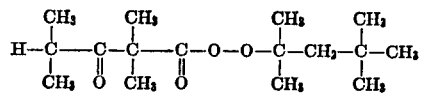

EXAMPLE 5

Preparation of cumylperoxy 2,2,4-trimethyl-3-oxovalerate

To 16.72 g. (0.11 mole) of cumene hydroperoxide was added a solution of 1.00 g. (0.025 mole) of sodium hydroxide in 1.5 ml. of water, at 10–20° C., with agitation. To the resulting mixture was slowly added 14.00 g. (0.10 mole) of 2,2,4-trimethyl-3-hydroxy-3-pentenoic acid beta-lactone, at 10–20° C., with stirring. The reaction mixture was stirred at 10–20° C. for an hour and then at 35° C. for four hours. It was diluted with 120 ml. of ether, washed twice with 50-ml. portions of water, and finally dried over anhydrous magnesium sulfate. After the removal of ether and low-boiling materials under reduced pressure, a clear liquid product was obtained in 75% yield and identified as the keto perester having the structure as indicated on the right-hand side of Equation 2.

EXAMPLE 6

Preparation of p-methylcumylperoxy 2,2,4-trimethyl-3-oxovalerate

A solution of 1.00 g. (0.025 mole) of sodium hydroxide in 1.5 ml. of water was mixed with 18.26 g. (0.11 mole) of p-methyl-cumene hydroperoxide at 10–20° C. To the resulting mixture was slowly added 14.00 g. (0.10 mole) of 2,2,4-trimethyl-3-hydroxy-3-pentenoic acid beta-lactone at 10–20° C. with agitation. The reaction mixture was continuously stirred at 10–20° C. for an hour and then at 35° C. for four hours. It was diluted with 120 ml. of ether, washed twice with 50-ml. portions of water, and finally dried over anhydrous magnesium sulfate. After filtration and the removal of ether and low-boiling materials under reduced pressure, a clear liquid product was obtained in 75% yield and identified as the desired keto perester indicated by the following structural formula:

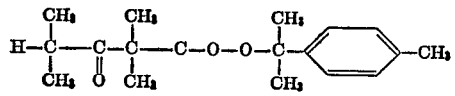

EXAMPLE 7

Preparation of p-isopropylcumylperoxy 2,2,4-trimethyl-3-oxovalerate

A solution of 1.00 g. (0.025 mole) of sodium hydroxide in 1.5 ml. of water was added to 21.34 g. (0.11 mole) of p-isopropylcumene hydroperoxide at 10–20° C. with stirring. To the resulting mixture was slowly added 14.00 g. (0.10 mole) of 2,2,4-trimethyl-3-hydroxy-3-pentenoic acid beta-lactone at 10–20° C. with agitation. The reaction mixture was continuously stirred at 10–20° C. for an hour and, then, at 35° C. for four hours. The mixture was diluted with 120 ml. of ether, washed with two 50-ml. portions of water and dried over anhydrous magnesium sulfate. Filtration and removal of ether and low-boiling materials under reduced pressure left a clear liquid product in 75% yield and identified as the keto perester having the following structural formula:

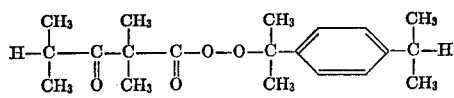

EXAMPLE 8

Preparation of p-t-butylcumylperoxy 2,2,4-trimethyl-3-oxovalerate

A solution of 1.00 g. (0.025 mole) of sodium hydroxide in 1.5 ml. of water was mixed with 22.44 g. (0.11 mole) of p-t-butylcumene hydroperoxide at 10–20° C. To the resulting mixture was slowly added 14.00 g. (0.10 mole) of 2,2,4-trimethyl-3-hydroxy-3-pentenoic acid beta-lactone at 10–20° C. with agitation. The reaction mixture was continuously stirred at 10–20° C. for an hour and then at 35° C. for four hours. It was diluted with 120 ml. of ether, washed twice with 50-ml. portions of water and dried over anhydrous magnesium sulfate. After filtration and removal of ether and low-boiling materials under reduced pressure, a clear liquid product was obtained in 75% yield and identified as the desired keto perester having the structural formula below:

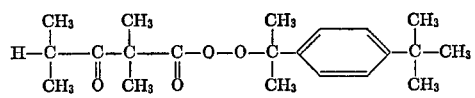

EXAMPLE 9
Preparation of p-chlorocumylperoxy 2,2,4-trimethyl-3-oxovalerate

To 20.52 g. (0.11 mole) of p-chlorocumene hydroperoxide was added a solution of 1.00 g. (0.025 mole) of sodium hydroxide in 1.5 ml. of water at 10–20° C. Fourteen grams (0.10 mole) of 2,2,4-trimethyl-3-hydroxy-3-pentenoic acid beta-lactone was slowly added to the resulting mixture at 10–20° C. with agitation. The reaction mixture was continuously stirred at 10–20° C. for an hour and at 35° C. for four hours, and then mixed with 120 ml. of ether. The ether solution was washed with two 50-ml. portions of water and dried over anhydrous magnesium sulfate. Filtration and removal of ether and low-boiling materials under reduced pressure gave a clear liquid product in a 75% yield and identified as the keto perester having the structure as shown on the right-hand side of Equation 3.

EXAMPLE 10

Preparation of α-ethyl-α-methylbenzylperoxy 2,2,4-trimethyl-3-oxovalerate

To 18.26 g. (0.11 mole) of α-ethyl-α-methylbenzyl hydroperoxide was added a solution of 1.00 g. (0.025 mole) of sodium hydroxide in 1.5 ml. of water, at 10–20° C. To the resulting mixture was slowly added 14.00 g. (0.10 mole) of 2,2,4-trimethyl-3-hydroxy-3-pentenoic acid beta-lactone at 10–20° C. with agitation. The reaction mixture was stirred at 10–20° C. for an hour and then at 35° C. for four hours. The mixture was mixed with 120 ml. of ether. The ether solution was washed twice with 50-ml. portions of water and dried over anhydrous magnesium sulfate. After filtration and removal of low-boiling materials under reduced pressure at room temperature using a water aspirator and a rotating evaporator, a clear liquid product was obtained in 75% yield. This compound was identified as the keto perester having the following structural formula:

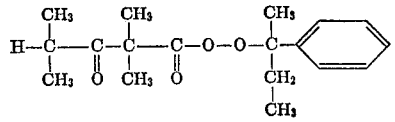

EXAMPLE 11

Preparation of phenylcyclohexylperoxy 2,2,4-trimethyl-3-oxovalerate

Two and one-half grams of 40% sodium hydroxide aqueous solution was mixed with 21.12 g. (0.11 mole) of phenylcyclohexyl hydroperoxide at 10–20° C. To the resulting mixture was slowly added 14.00 g. (0.10 mole) of 2,2,4-trimethyl-3-hydroxy-3-pentenoic acid beta-lactone at 10–20° C. with stirring. The reaction mixture was stirred at 10–20° C. for an hour and then at 35° C. for six hours. After this, it was diluted with 120 ml. of ether. The ether solution was washed with water and dried with anhydrous magnesium sulfate. Filtration and removal of low-boiling materials under reduced pressure gave a liquid product in a 75% yield. The product was identified as the keto perester having the structural formula as shown on the right-hand side of Equation 4.

EXAMPLE 12

Preparation of α-ethyl-α-methyl-m,m-di-sec-butyl-benzylperoxy 2,2,4-trimethyl-3-oxovalerate To 30.58 g. (0.11 mole) of α-ethyl-α-methyl-m,m-di-sec-butylbenzyl hydroperoxide was added 2.50 g. of 40% sodium hydroxide aqueous solution at 10–20° C. To the resulting mixture was slowly added 14.00 g. (0.10 mole) of 2,2,4-trimethly-3-hydroxy-3-pentenoic acid beta-lactone at 10–20° C. with agitation. The reaction mixture was continuously stirred at 10–20° C. for an hour and then at 35° C. for six hours. It was mixed with 120 ml. of ether, washed with water and dried over anhydrous magnesium sulfate. After filtration and removal of low-boiling materials, a liquid peroxy product was obtained in a 75% yield and identified as the keto perester having the structure as shown below.

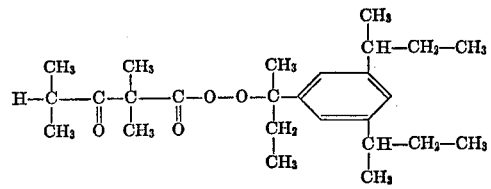

EXAMPLE 13

Preparation of m,m-dicyclohexylphenylcyclohexylperoxy 2,2,4-trimethyl-3-oxovalerate Two and one-half grams of 40% sodium hydroxide aqueous solution was mixed with 39.16 g. (0.11 mole) of m,m-dicyclohexylphenylcyclohexyl hydroperoxide at 10–20° C. To the resulting mixture was slowly added 14.00 g. (0.10 mole) of 2,2,4-trimethyl-3-hydroxy-3-pentenoic acid beta-lactone at 10–20° C. with agitation. After being stirred at 10–20° C. for an hour and at 35° C. for six hours, the reaction mixture was diluted with 120 ml. of ether. It was washed with water and dried over anhydrous magnesium sulfate. Filtration and removal of low-boiling materials gave a liquid peroxy product, identified as the keto perester having the structure as shown below.

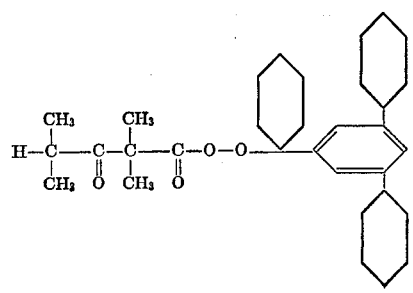

EXAMPLE 14

Preparation of 1,4,4-triethyl-1,2,3,4-tetrahydronaphthylperoxy 2,2,4-trimethyl-3-oxovalerate To 27.28 g. (0.11 mole) of 1,4,4-triethyl-1,2,3,4-tetrahydronaphthyl hydroperoxide was added 2.50 g. of a 40% sodium hydroxide aqueous solution, at 10–20° C., with stirring. To the resulting mixture was slowly added 14.00 g. (0.10 mole) of 2,2,4-trimethyl-3-hydroxy-3-pentenoic acid beta-lactone, at 10–20° C., with agitation. The reaction mixture was continuously stirred at 10–20° C. for an hour and then at 35° C. for six hours. After this, it was diluted with 120 ml. of ether. The resulting ether solution was washed with water and dried over anhydrous magnesium sulfate. After removing the low-boiling materials by evaporation under reduced pressure, a liquid product was obtained in a 75% yield, and identified as the keto perester having the structural formula as indicated on the right-hand side of Equation 5.

EXAMPLE 15

Preparation of 1,4,4-triisopropyl-1,2,3,4-tetrahydronaphthylperoxy 2,2,4-trimethyl-3-oxovalerate A solution of 1.00 g. (0.025 mole) of sodium hydroxide in 1.50 g. of water was mixed with 31.90 g. (0.11 mole) of 1,4,4-triisopropyl-1,2,3,4-tetrahydronaphthyl hydroperoxide at 10–20° C. To the mixture was slowly added 14.00 g. (0.10 mole) of 2,2,4-trimethyl-3-hydroxy-3-pentenoic acid beta-lactone at 10–20° C. with agitation. The reaction mixture was continuously stirred at 10–20° C. for an hour and then at 35° C. for six hours. To the mixture was added 120 ml. of ether. The resulting ether solution was washed with water and dried over anhydrous magnesium sulfate. Filtration and removal of low-boiling materials under reduced pressure gave a liquid peroxide product, identified as the keto perester having the structure below.

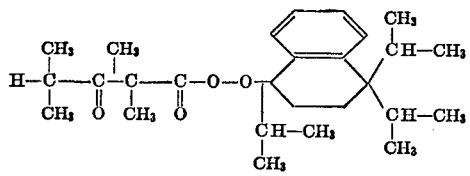

EXAMPLE 16

Preparation of 1,4,4-tri-t-butyl-1,2,3,4-tetrahydronaphthylperoxy 2,2,4-trimethyl-3-oxovalerate A solution of 1.00 g. (0.025 mole) of sodium hydroxide in 1.50 g. of water was mixed with 36.52 g. (0.11 mole) of 1,4,4-tri-t-butyl-1,2,3,4-tetrahydronaphthyl hydroperoxide at 10–20° C. To the mixture was slowly added 14.00 g. (0.10 mole) of 2,2,4-trimethyl-3-hydroxy-3-pentenoic acid beta-lactone at 10–20° C. with stirring. The reaction mixture was stirred at 10–20° C. for an hour and then at 35° C. for six hours. It was diluted with 120 ml. of ether, washed with water and dried over anhydrous magnesium sulfate. The removal of low-boiling materials under reduced pressure gave a liquid peroxide product, identified as the keto perester possessing the following structure:

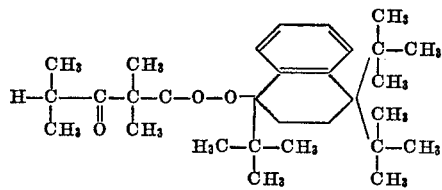

EXAMPLE 17

Preparation of 1,3,3-trimethylindanylperoxy 2,2,4-trimethyl-3-oxovalerate

To 21.12 g. (0.11 mole) of 1,3,3-trimethylindane-1-hydroperoxide was added 2.50 g. of a 40% sodium hydroxide aqueous solution at 10–20° C. with stirring. To the resulting mixture was slowly added 14.00 g. (0.10 mole) of 2,2,4-trimethyl-3-hydroxy-3-pentenoic acid beta-lactone at 10–20° C. with agitation. After being stirred at 10–20° C. for an hour and then at 35° C. for six hours, the reaction mixture was mixed with 120 ml. of ether, washed with water and dried over anhydrous magnesium sulfate. Filtration and removal of low-boiling materials under reduced pressure left a liquid peroxide product, identified as the keto perester represented by the structural formula as shown on the right-hand side of Equation 6.

EXAMPLE 18

Preparation of triphenylmethylperoxy 2,2,4-trimethyl-3-oxovalerate

A solution containing 1.00 g. (0.025 mole) of sodium hydroxide and 1.50 g. of water was mixed with 30.36 g. (0.11) mole) of triphenylmethyl hydroperoxide at 10–20° C. To the resulting mixture was slowly added 14.00 g. (0.10 mole) of 2,2,4-trimethyl-3-hydroxy-3-pentenoic acid beta-lactone at 10–20° C. with agitation. The reaction mixture was stirred at 10–20° C. for an hour and then at 35° C. for six hours. It was then mixed with 120 ml. of ether, washed with water and dried over anhydrous magnesium sulfate. After the removal of low-boiling materials under reduced pressure, a liquid peroxide product was obtained and identified as the keto perester having the structure as shown on the right-hand side of Equation 7.

What is claimed is:

1. Organic peroxides having the formula

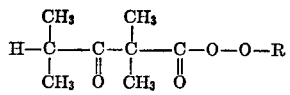

wherein R is selected from the group of radicals consisting of t-butyl, t-amyl, 1,1,3,3-tetramethylbutyl, cumyl, p-methyl-cumyl, p-isopropylcumyl, p-t-butylcumyl and o-chlorocumyl, alpha-ethyl-alpha-methylbenzyl, phenylcyclohexyl, alpha-ethyl-alpha-methyl-m,m-di-sec-butyl-benzyl, m,m-dicyclohexyl-phenylcyclohexyl, 1,4,4-tri-ethyl-1,2,3,4-tetrahydronaphthyl, 1,4,4-tri-isopropyl-1,2,3,4-tetrahydronaphthyl, 1,4,4-tri-t-butyl-1,2,3,4-tetrahydronaphthyl, 1,3,3-trimethylindanyl.

2. An organic peroxide according to claim 1 wherein R is tertiary butyl.

3. An organic peroxide according to claim 1 wherein R is tertiary amyl.

4. An organic peroxide according to claim 1 wherein R is cumyl.

5. An organic peroxide according to claim 1 wherein R is 1,1,3,3-tetramethylbutyl.

6. An organic peroxide according to claim 1 wherein R is para-methyl-cumyl.

References Cited

UNITED STATES PATENTS

| | | | |
|---|---|---|---|
| 2,455,569 | 12/1948 | Dickey | 260—610 R |
| 2,537,853 | 1/1951 | Pezzaglia | 260—610 R |
| 2,818,437 | 12/1957 | Wildi | 260—610 |
| 3,472,901 | 10/1969 | Tyssiss | 260—610 R |
| 3,308,163 | 3/1967 | McKellin | 260—453 R |

FOREIGN PATENTS

| | | | |
|---|---|---|---|
| 1,066,664 | 4/1967 | Great Britain | 260—610 D |

BERNARD HELFIN, Primary Examiner

W. B. LONE, Assistant Examiner

U.S. Cl. X.R.

260—610 D, 593 A, 593 R, 586 R, 389, 93.5 R, 89.5 A, 92.8 R